United States Patent
Schlesier et al.

(10) Patent No.: US 7,528,714 B2
(45) Date of Patent: May 5, 2009

(54) FLEXIBLE POSITION TRACKING SYSTEM AND TRACKING AND RESEARCH METHODS UTILIZING SUCH SYSTEMS

(75) Inventors: Joseph R. Schlesier, West Orange, NJ (US); William E. Vallier, Bridgewater, NJ (US); Ryan M. Bell, Edison, NJ (US); Andrew J. Bodart, Murray Hill, NJ (US); Steven V. Rimar, East Brunswick, NJ (US)

(73) Assignee: Accenture Global Services GmbH, Schaffhausen (CH)

( * ) Notice: Subject to any disclaimer, the term of this patent is extended or adjusted under 35 U.S.C. 154(b) by 341 days.

(21) Appl. No.: 11/509,694

(22) Filed: Aug. 25, 2006

(65) Prior Publication Data
US 2007/0296573 A1 Dec. 27, 2007

Related U.S. Application Data (60) Provisional application No. 60/816,319, filed on Jun. 26, 2006.

(51) Int. Cl.
*G08B 1/08* (2006.01)
(52) U.S. Cl. .................................. 340/539.13
(58) Field of Classification Search ............ 340/539.13, 340/686.1, 990, 991, 425.5, 426.19, 825.69, 340/825.49; 455/456.1, 457; 701/213
See application file for complete search history.

(56) References Cited

U.S. PATENT DOCUMENTS

| | | | | |
|---|---|---|---|---|
| 5,835,377 | A * | 11/1998 | Bush | 700/99 |
| 6,816,878 | B1 * | 11/2004 | Zimmers et al. | 709/200 |
| 6,838,998 | B1 * | 1/2005 | Brown et al. | 340/825.49 |
| 7,015,817 | B2 * | 3/2006 | Copley et al. | 340/573.4 |
| 7,102,510 | B2 * | 9/2006 | Boling et al. | 340/539.13 |
| 7,123,141 | B2 * | 10/2006 | Contestabile | 340/539.13 |
| 7,375,654 | B2 * | 5/2008 | Culpepper et al. | 340/995.15 |
| 2002/0077750 | A1 | 6/2002 | McDonald, Jr. et al. | |
| 2003/0027583 | A1 | 2/2003 | Yugami | |
| 2003/0190911 | A1 * | 10/2003 | Hirano | 455/423 |
| 2006/0009234 | A1 | 1/2006 | Freer | |

FOREIGN PATENT DOCUMENTS

| EP | 1 669 774 A1 | 6/2006 |
|---|---|---|
| WO | WO 98/59256 | 12/1998 |

\* cited by examiner

*Primary Examiner*—Phung Nguyen
(74) *Attorney, Agent, or Firm*—Finnegan, Henderson, Farabow, Garrett & Dunner, LLP (57) ABSTRACT

Disclosed herein are systems and related methods for flexibly tracking the position of one or more mobile devices using a satellite positioning system. The embodiments of the invention are particularly adapted to provide an inexpensive, reliable, flexible, and readily scalable solution that can be readily applied without requiring large capital expenditures. Various embodiments of the invention are particularly suitable for scalable use in a variety of areas on a temporary basis.

27 Claims, 3 Drawing Sheets

FLEXIBLE POSITION TRACKING SYSTEM AND TRACKING AND RESEARCH METHODS UTILIZING SUCH SYSTEMS

CROSS REFERENCE TO RELATED APPLICATIONS

This application claims the benefit of priority of co-owned U.S. provisional patent application Ser. No. 60/816,319, filed Jun. 26, 2006.

FIELD OF THE INVENTION

The present invention in general, relates to position location tracking systems. More particularly, the invention relates to a system and related methods for flexibly tracking the position of one or more mobile devices using a satellite positioning system.

BACKGROUND OF THE INVENTION

The commercial use of satellite positioning systems has grown exponentially in recent years as governments, such as the United States, have continued to make more satellite positioning signals and data publicly available. In particular, the Global Positioning System ("GPS") network created by the United States government is a fully-functional satellite navigation system that provides detailed coverage of North America. The GPS network utilizes a constellation of more than two dozen GPS satellites to broadcast precise timing signals by radio frequency that are receivable and readable by GPS receivers. This allows the receivers to accurately determine their location (longitude, latitude, and altitude) in any weather, day or night, anywhere a clear view of the sky can be obtained.

The GPS network has become a vital free asset to many businesses, and has become virtually indispensable for modern sea and air navigation. It is also an important tool for present day map-making and land surveying. GPS-based navigation systems in particular presently are used by the defense and government agencies, companies, and the general public as a navigation aid in cars, airplanes, and ships. The system can also be used by computer controlled harvesters, mine trucks and other vehicles. Hand-held GPS receivers can be used by mountain climbers and hikers. It is becoming increasingly popular for GPS receivers and navigation systems to be combined in a bundle within personal digital assistants (PDAs) and cars.

GPS receivers determine the time delays between transmission and reception of the signals by comparing time shifts between the unique pseudo-random noise (PN) code signals received from the various and internally generated PN signal sequences. Initially, the accuracy of a GPS position fix was largely dependent upon the amount of processing applied to the various received satellite signals. This required high performance electronics, which in turn required significant energy sources. Thus, size and battery life was a major design hurdle for early portable GPS receivers designed for personal use. These size and power consumption factors, however, have been largely alleviated by improvements in microchip design and battery design allowing even low cost modern portable receivers to outperform much more expensive earlier models. GPS receivers now are presently available as stand-alone handheld units, as features built into mobile phones and PDAs, and as relatively small PCMCIA cards, or CF cards, or USB devices for use with personal computers, PDAs, and other electronic equipment.

These commercially available portable GPS receivers can vary widely in terms of accuracy due in part to the desire to limit the number of radio receivers. More receivers are needed to tune in more satellites and increase accuracy. Nevertheless, most handheld units presently can provide results accurate within approximately 20-30 meters, which is suitable for most uses of the general public.

In some GPS applications, however, the signal strength from the GPS satellites is so low that either the received signals cannot be processed, or the time or bandwidth required to process the signals becomes excessive. As such, to improve the signal processing, a GPS receiver may receive assistance data from a network to assist in satellite signal acquisition and/or processing, or transmit the satellite signal information to the network to do the processing on behalf of the portable unit. For example, the GPS receiver may be integrated within a cellular telephone and may receive the assistance data from a server using a wireless communication network. This technique of providing assistance data to a remote mobile receiver has become known as "Assisted-GPS" or A-GPS.

The proliferation of portable GPS location fixing technology is opening up new and innovative search functionalities in mobile phones. As digital circuit and processing technology improves, a larger proportion of mobile telephone units could be equipped with GPS capabilities such as A-GPS. This could then allow the telephone to be provided with mobile web search tools that allow users to search keywords and have their search results be specific to their current geographic locations. Location-based services are offered by some cell phone networks as a way to send custom advertising and other information to cell-phone subscribers based on their current location. In such cases, the cell-phone service provider obtains the location from a GPS chip built into the phone (or using radiolocation and triangulation based on the signal-strength of the closest cell-phone towers for phones without GPS features). One example of a location-based service might be to allow the subscriber to find the nearest business of a certain type, such as a men's clothing store or a hotel having vacancies.

One early commercial use of GPS technology was for GPS tracking. GPS tracking systems use GPS receivers (typically coupled to an electronic communication means for reporting the information from the GPS receiver) to determine the location of one or more GPS receivers (representing, for example, a vehicle, person, etc.), and then record the position of the receiver at regular intervals in order to create a track file or log of activities and/or locations. The recorded data can be stored within the tracking unit, or it may be transmitted in real-time or near real-time via wired or wireless communication means to a central location, such as an computer system accessible over the Internet. This allows the tracking and position data to be collected and reported in real-time, using either web browser based tools or customized software made available by the computer system. Such systems are currently used by transatlantic shipping companies and parcel services for tracking of tankers and barges. Most commercially available GPS tracking solutions used for this purpose, however, are expensive requiring significant capital investments for their use to be realized. As such, present GPS tracking solutions, while having many potential uses in other areas are not practical solutions for those areas due to their complexity and related expense. This is particularly so where the use of the GPS tracking solution is only required for a situation which is temporary in nature.

For example, civil system engineers, consultants, urban planners, and other professionals are commonly engaged by various companies and organizations to perform studies concerning the movement and interaction of various objects, such as buses within a public transportation system, trucks within the fleet of a shipping business, and shuttles in airports, theme parks, and other locations. A major task of these professionals in such cases is the collection of data regarding the timed movements, locations, and interactions of the objects within the system being studied.

Further, an individual, company or organization may desire to track the activities or location of an object temporarily as part of an effort to make certain that it is being used only within a target area. This could be, for example, where a company wishes to confirm compliance with safety regulations or to confirm that the object, such as company car, is not being used for unauthorized purposes. In such cases, it would be helpful if a readily deployable and temporary location tracking system was commercially available.

Similarly, for large events which occur infrequently or in different locations, such as large sporting events (e.g., the Super Bowl or a golf tournament), city-wide scaled events such as holiday festivities (e.g., New York's Times Square on New Year's Eve or Washington D.C. on July 4th), and unplanned events such as natural disasters, resource planners may wish to track in near real-time the location of various objects to ensure the safety of the public and/or to adjust resources as needed. For example, it may be desirable for a central planner to be able to know in real-time the location of various security workers and police officers within the event area so that rapid redeployment can take place in the case of emergencies. Additionally, resource planners may find it useful or even necessary to know the location of transportation resources, such as evacuation buses or shuttle buses, to predict and schedule arrival/departure times or to direct crowd control efforts.

While satellite position tracking would appear to be a way to obtain such information for the above position tracking situations, presently there are no satellite position tracking systems that provide an inexpensive, reliable, and readily scalable solution that can be readily applied to such situations on a temporary basis without requiring large capital expenditures. Current systems are and expensive inflexible designed for large scale and long term implementation in commercial settings, such as for shipping companies, large public transportation organizations, and other like situations.

Thus, there remains a need for inexpensive, reliable, and readily scalable position tracking solutions that can be readily applied to temporary study situations on an as needed basis without requiring large capital expenditures.

SUMMARY OF THE INVENTION

It is an object of the present invention to provide improved satellite position tracking systems that provide an inexpensive, reliable, flexible, and readily scalable solution that can be readily applied to such situations on a temporary basis without requiring large capital expenditures.

Also, it is an object of certain aspects of the present invention to provide methods of deploying and using a satellite position tracking system that is particularly adapted for scalable use in a variety of areas on a temporary basis.

The present invention provides tracking systems and related methods that may be readily scaled for a variety of purposes with minimal capital investment for the tracking of locations of various objects on a temporary basis.

Systems and methods according to the present invention comprise locating the position of a mobile device using a satellite positioning system. In one embodiment, satellite measurement data is obtained from one or more, and preferably a plurality, of satellites at a mobile device. The position of the mobile device is then computed using the satellite measurement data. Information concerning the computed position is then sent via a cellular communication network to a central position tracking platform, such as computer network of associated computing devices, storage devices, and related applications. From this central platform, a user can track the relative locations and/or routes taken by a plurality of such mobile devices over a period of time. Preferably, such users can interact with the central position tracking platform remotely over a distributed computer network, such as the Internet.

Certain embodiments of the invention include a tracking system that enables flexible location tracking of various mobile devices monitored by a central position tracking network via a wireless communication network, such as the cellular network for a mobile telephone service provider. The wireless communication network is in wireless communication with one or more of the mobile devices, and the mobile devices need not be of the same design or configuration. Each mobile device contains means for electronically communicating with the wireless network and means for receiving and interpreting positioning signals from one or more satellites to determine a current geographic position of that particular mobile device.

In certain preferred embodiments of the present invention, the wireless network is a cellular network, one or more of the mobile devices are GPS-enabled cellular telephones, and location report messages are communicated to the central position tracking network as a cellular text message using a supported text messaging protocol of the wireless network. In this manner, the mobile device could send various text messages, such as a every minute, detailing its current coordinates (or, if no coordinates are currently available, then the last known coordinates or an identification of why the current position is not determinable currently).

In other preferred embodiments of the present invention, the central position tracking network utilizes a position tracking application running on a server, which application includes a mapping application, such as a custom built mapping application or a commercially available mapping program. Optionally, the position tracking application could, for example, export a map display to a local user interface in real-time or to a remote interface front end, such as via a front-end application that enables users to access the stored tracking information over the Internet via a web server (such as a with an Internet browser and secure networking application).

The methods according to one preferred embodiment of the present invention combines the determining of the mobile device's position through satellite measurement data with the capability to send the coordinates through instant "text messaging" protocols. The mobile device according to embodiments of the present invention preferably uses the GPS satellite positioning system available in North America to obtain position information.

Most preferably, methods according to the present invention enable systems of the present invention to be flexible and thus customized to their purpose. Users of methods of the present invention can select mobile devices and wireless network service providers to meet the particular needs of the project. For example, if the study needed to cover a fairly large geographic area (such as the mid-Atlantic region of the United States), service coverage and service plans offered by various different wireless network providers would most likely be a primary factor. However, in situations where the ability to access the central position tracking network's data is needed at a variety of positions including at the mobile devices which are being tracked, it might be necessary to elect service providers, plans and devices such that suitable computing devices (e.g., PDAs and laptop computers) equipped with GPS and cellular broadband cards can be elected as one or more of the mobile devices. Finally, a particular situation may dictate rugged mobile devices with extensive battery power, thus necessarily limiting the options that realistically can be elected by the user for wireless network service providers, particular message communication mechanism employed (text message versus data call of IP message), and the like.

According to the most preferred embodiments, the mobile device is a GPS positioning-enabled cellular telephone that may use its cellular transceiver to communicate over available cellular networks with one or more servers, such as a position server, in the central tracking platform. However, those skilled in the art will recognize, however, that the mobile device may instead include transceiver may also include pagers, laptop computers, personal digital assistants (PDAs), among other mobile devices having wireless communication capabilities and capable of obtaining and/or transmitting satellite positioning information and data.

As such, embodiments of the present invention are particularly suitable for use in case studies, in pilot studies, and other like situations that are not fully industrial or long-term and where a large or permanent investment in hardware is not appropriate or desired. For example, the present invention would be particularly suitable if a management consulting group wanted to perform a study for three weeks to see how efficiently a particular company's private fleet of delivery trucks works.

One aspect of the present invention is a system for tracking the location of mobile entities using a constellation of satellites of a satellite positioning system. The tracking system includes a wireless communication network and one or more mobile devices. Each of the mobile devices are associated with a particular mobile entity and include means for electronically communicating with the wireless communication network and means for receiving and interpreting positioning signals from one or more satellites to determine a then-current geographic position of that mobile device. The tracking system also includes a central position tracking platform. The central position tracking platform is in electronic communication with the wireless communication network and includes a server running a position tracking application and a database for storing position tracking information regarding the mobile entities. The central position tracking platform also has a front end interface for enabling a user to review the position tracking information in real time. Each the mobile device of the tracking system is configured to transmit a location report message upon a position request. The location report message contains position information of the mobile device originating the message and is transmitted via the wireless communication network to the central position tracking platform where the position information is stored in the database.

Another aspect of the present invention is a method for flexibly tracking the position of one or more mobile entities using a constellation of satellites of a satellite positioning system. This method includes analyzing a tracking problem to formulate a design of a location tracking system. This design includes a selection of a wireless communication network and a configuration of a central position tracking platform to be in electronic communication with the wireless communication network. The central position tracking platform includes a server running a position tracking application and a database for storing position tracking information regarding the mobile entities. The location tracking system design further includes an assignment of particular mobile device types to particular mobile entities where the assigned mobile device types are compatible with the wireless communication network and the central position tracking platform and suitable for the tracking problem. The method further includes assembling and deploying the location tracking system. This assembling and deploying comprises distributing mobile devices of the assigned mobile device types to the mobile entities. Additionally, the method includes operating the location tracking system by having each of the mobile devices transmit a location report message upon a position request. The location report messages contain position information of the mobile device originating the message and are transmitted via the wireless communication network to the central position tracking platform where the position information is stored in the database. The method also comprises analyzing the tracking data stored in the database, and deconstructing the system.

Additionally, yet another aspect of the present invention is a system for tracking the location of mobile entities using a constellation of satellites of a satellite positioning system. The tracking system includes a wireless communication network and one or more mobile devices. Each mobile device is associated with a particular mobile entity and comprises means for electronically communicating with the wireless communication network and means for receiving and interpreting positioning signals from one or more satellites to determine a then-current geographic position of that mobile device. The tracking system also includes a central position tracking platform in electronic communication with the wireless communication network. The central position tracking platform includes a server running a position tracking application and a database for storing position tracking information regarding the mobile entities. The central position tracking platform also has a front end interface for enabling a user to review the position tracking information in real time. The tracking system is operable such that each of the mobile devices contain an applet configured to transmit a location report message at regular intervals. Such location report messages contain position information obtained from the receiving and interpreting means and being transmitted by the communicating means of the device via the wireless communication network to the central position tracking platform where the position information is stored in the database.

The various embodiments of the invention having thus been generally described, several illustrative embodiments will hereafter be discussed with particular reference to several attached drawings.

DETAILED DESCRIPTION OF THE PREFERRED EMBODIMENTS

Figure 1:
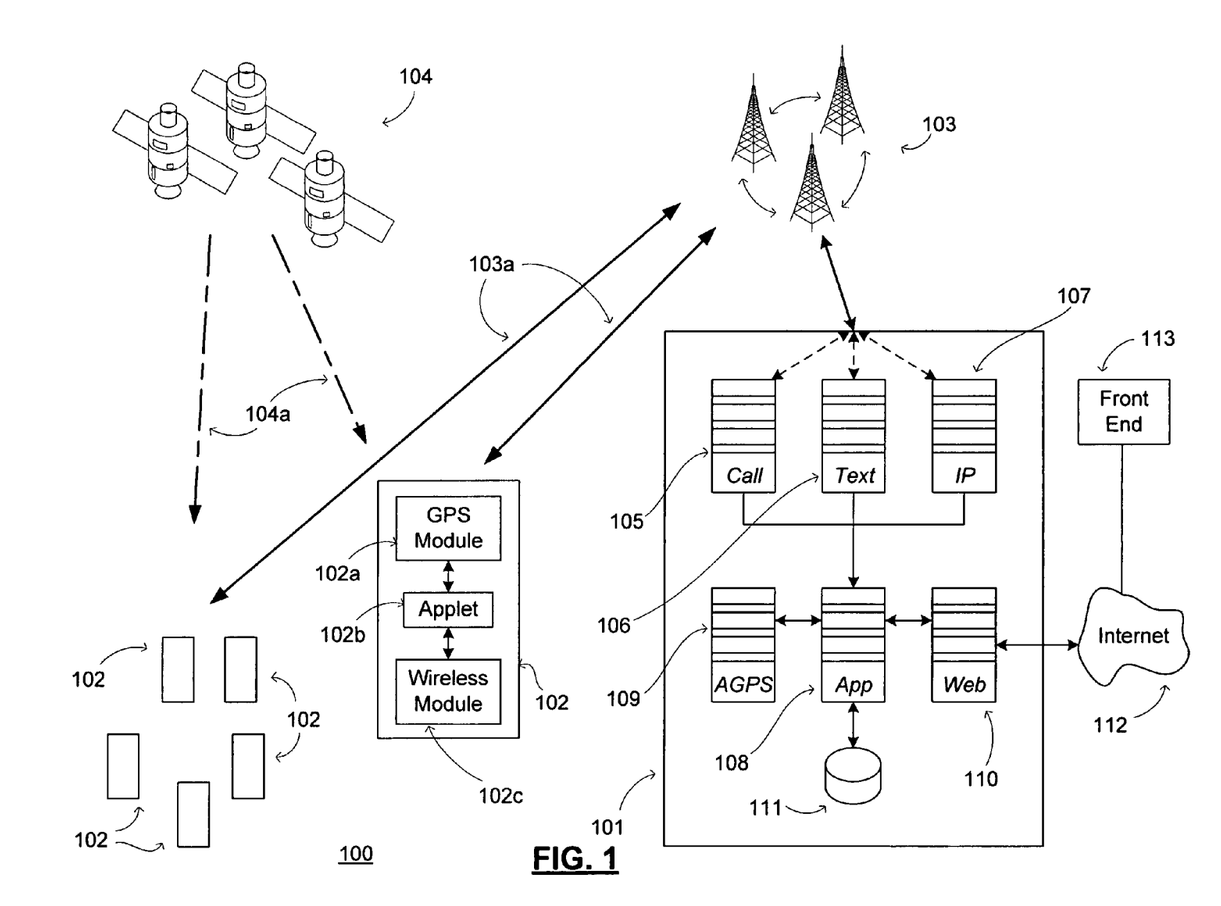
FIG. 1 is a schematic diagram showing a system for enabling flexible location tracking according to an embodiment of the present invention.

FIG. 1 provides a depiction of one embodiment of a system 100 for enabling flexible location tracking according to the present invention. In particular, as depicted in FIG. 1 system 100 includes a central position tracking network ("CPT network") 101 in communication with a wireless communication network 103 (such as the cellular network for a mobile telephone service provider). The wireless communication network in turn is in wireless communication with one or more, and preferably more than one, mobile devices 102. The mobile devices need not be of the same design or configuration, however it is necessary that each mobile device 102 contains means for electronically communicating with the wireless network 103 and means for receiving and interpreting positioning signals 104a from one or more satellites 104 to determine a current geographic position of that particular mobile device.

The mobile devices 102 may comprise various conventional computing and communication devices. Typically, the mobile devices 102 will include at least one processor and persistent memory for storing various control programs. The processor may comprise a microprocessor, an instruction-set processor (e.g., a microcontroller), or various other types of processing elements known in the art. The processor is coupled to the memory that may comprise volatile memory (e.g., RAM), non-volatile memory (e.g., disk drives), removable memory, and/or combinations thereof. The processor cooperates with support circuitry of the device, such as power supplies, clock circuits, cache memory, and communication and position determining modules, among other conventional support circuitry, to facilitate operation of the mobile device 102 and to assist in executing software routines stored in the memory (such as Java enabled applets to control timing and sending of the GPS signals).

For example, certain wireless telephone providers, including Nextel and others, provide cellular telephones that have GPS capabilities integrated into the phone. In preferred embodiments of the present invention, such cellular telephones with integrated GPS capabilities are utilized as simple implementations of the mobile devices 102. Understandably, such telephone handsets are readily portable by nature, could be deployed and redeployed as needed, such as moved from mobile entity to entity (e.g., vehicle to vehicle or person to person) being tracked. Particularly suitable integrated GPS and cellular telephone handsets could include, for example, those that are relatively sturdy in design, making them able to be used in hot and rugged conditions. Further, in many situations it will be desirous if battery life is fairly strong (such as if battery power can not be readily augmented during use by electrical outlets or standard mobile battery chargers such as, e.g., automobile cigarette lighter adapters).

In alternative embodiments of the invention, other electronic devices can be utilized for the mobile devices 102. For example, another implementation can include one or more laptop computers equipped with WiFi networking cards (or wireless broadband cards) and GPS positioning units attachable to the computer via a USB port. Such situations in most circumstances should be limited to where there is sufficient access to electrical power outlets to avoid having to rely upon the battery life of the laptop computers.

Similarly, certain PDAs (or smart phones) are available that are equipped with cellular or other wireless communication capabilities and which are capable of supporting add-on or integrated GPS positioning hardware and running associated GPS position-determining software applications.

One advantage of using laptop computers or other significantly powerful computing devices as the mobile devices is that it may be capable of producing significantly more leads (data points and other information). However, such devices generally have much higher relative hardware costs, are typically more delicate, and often may raise power consumption issues. Additionally, the need to leave expensive hardware in portable situations (e.g., needing to leave a laptop computer within an automobile at all times) may of course raise security and theft concerns.

The repetitive position obtaining and transmitting process can be automated by an applet 102b installed on each mobile device 102, such as a custom built Java applet. Where the mobile devices 102 of system 100 are GPS enabled cellular telephones, the applet can be, for example, a Java applet stored on the SIM card or other memory of the phone. Preferably, every time each device 102 (e.g., telephone) is turned on, the applet is automatically initialized and runs in the background to communicate with a GPS module 102a and wireless communication module 102c of the device 102. The GPS module is the hardware and software routines of the device 102 that monitor the satellite positioning signals 104a sent from the various satellites 104 while the wireless communication module 102c is the standard communication portions and related routines of a modern mobile telephone that are responsible for voice and data calls, text messaging, and similar communication features. Typically periodically, such as every minute, the applet obtains location coordinates from the GPS module 102c (if they can be captured or computed from the available satellite positioning signals 104a) and then causes the wireless communication module to transmit those location coordinates, along with other relevant data (e.g., a time stamp, device ID, GPS signal quality, etc.) as a location report message signal 103a over the wireless communication network 103 (such as the cellular telephone service provider's network) using the appropriate communication mechanism (text messaging, cellular data call, TCP/IP, etc.). The location report message is then routed through the network 103 to the central position tracking network 101, where it is then processed and stored upon receipt, as described further below.

As shown in FIG. 1, the location report message signal 103a can ultimately be communicated to the CPT network 101 by various mechanisms (depending upon, inter alia, the design of the wireless network, the mobile device of origin, service provider contract restrictions, and the like), including cellular data calls and cellular text messages where the wireless network 103 is a commercial cellular telephone network, and TCP/IP enabled mechanisms (e.g., instant messages, email, etc.) where the network 103 is a wireless broadband network, WiFi network, or other electronic network supporting IP-based wireless communication. Thus, the CPT network 101 can include means for communicating via these various protocols, such as one or more communication servers. The example CPT network 101 depicted in FIG. 1 contains three such communication servers, namely, a data call communication server 105, a text message communication server 106, and an IP communication server 107.

In most preferred embodiments of the present invention wherein the network 103 is a cellular network, the location report message is not communicated to the CPT network 101 as a cellular data call or over TCP/IP mechanisms, but rather as a cellular text message using a supported text messaging protocol of the wireless network. In this manner, the mobile device could send various text messages, such as a every minute, detailing its current coordinates (or, if no coordinates are currently available, then the last known coordinates or an identification of why the current position is not determinable currently). Notably, text messaging services offered by cellular networks generally have a built-in message failure and retry loop. If at any time a mobile device attempts to send a text message and fails (such as because of network coverage or congestion issues), the device will constantly poll the network and attempt to retry the sending of the text message at the next earliest possible opportunity.

In any event, one of ordinary skill in the art will readily appreciate that, when the text messaging approach is employed, it will be beneficial to obtain cellular network service plans for the mobile devices being used that permit a high number (e.g., unlimited) of text messages over the appropriate time period of the study. Similarly, in situations where data calls were used, a cellular service plan that has a high number of minutes per phone would be preferred.

In preferred embodiments of the invention, the applet 102b on each mobile device 102 starts a "push" from the mobile device 102 (e.g., GPS enable cellular telephone) to cause the GPS module 102a to determine where it is currently located using GPS satellite positioning signals 104a. It should be understood, however, that some GPS modules 102a are designed to recalculate and update its current calculated position continuously. Thus, in such cases, the applet 102b will ask for the latest calculated position from the GPS module 102a. The final calculated GPS coordinates are then outputted to the wireless module 102c, such as via a comma delimited text format or an XML formatted file as follows:

```
<GPSUnit>
    <GPSUnit X>
        <UnitName>unit name</UnitName>
        <UnitLongitude>unit longitude decimal format
        </UnitLongitude>
        <UnitLatitude>unit latitude in decimal format
        </UnitLatitude>
        <UnitTS>time stamp</UnitTS>
        <UnitAccuracy>GPS read accuracy</UnitAccuracy>
        <UnitSpeed>unit current speed</UnitSpeed>
        <UnitHeading>unit heading</UnitHeading>
    </GPSUnit X>
</GPSUnit>
```

In preferred embodiments of the present invention, as described above, the coordinates and other data (such as device name/ID, time stamps, accuracy information, failure information, and, where available, unit speed and heading information as depicted above) put into text format in the location report message can be then be used as the body of a text message for sending by the wireless communication module 102c over the wireless network 103 to the text messaging server 106 of the CPT network 101. In certain preferred embodiments, the location report message will include at least a user or device ID, latitude, longitude, date and time of the reading, whether satellite or cell site was used, speed of the user, heading of the user, GPS response time, GPS status information, and the number of satellites used to calculate the position.

Depending upon how the location report message is sent, it will be received by an appropriate server of CPT network 101 (such as a data call communication server 105 for receiving cellular data calls over network 103, an IP communication server 107 for TCP/IP based communications, or a text messaging server 106 as described above). The message containing the coordinates is thereafter transferred to the position tracking application server 108, where it is then parsed. Preferably, as described above, the location report message is sent in text format. Also preferably, as depicted above, the data of each position report message is provided in XML or other like format such that it can be readily input into the desired position tracking application running on application server 108. In situations where the data is not in XML or other suitable format, an XML extraction layer can be utilized in the application server 108 to extract and parse the various bits of data within the various location report messages received by the various communication servers 105-107 before it is input into the position tracking application.

In situations where TCP/IP communication is used between the mobiles devices and the CPT network 101, an XML data stream could be sent on a virtually continuous basis using suitable networking protocols to the tracking application server 108, and that server would directly read the XML stream. Such embodiments would have the advantage of providing a constantly updated information stream detailing where particular mobile devices are located on a near up-to-the-second basis.

The position tracking server 108 is adapted to run an appropriate position tracking application, which application can be any application, commercially available or custom built, suitable for receiving and storing positional coordinates for a plurality of mobile entities (i.e., mobile devices 102) and then allowing users to review the tracking information in a variety of manners, such as plotting last-known or time-specific positions for certain mobile devices on various maps, or plotting routes for one or more mobile devices on a map for a given time slice). The tracking server parses each received message (e.g., identifying a time, location and mobile device ID with each message and storing that message in a tracking database 111. Optionally, the position tracking application could, for example, export a map display to a local user interface in real-time or to a remote interface front end 113, such as via a front-end application that enables users to access the stored tracking information over the Internet 112 via a web server 110 in conventional fashion (such as a with an Internet browser and secure networking application).

In most preferred embodiments of the present invention, the position tracking application running on the tracking server includes a mapping application, such as a custom built mapping application (e.g., a grid-parceled map showing a relatively small geographic area in detail, with an identification of temporary structures) or a commercially available mapping program, such as provided by, for example, MapPoint or CometTracker.

Alternatively, but less preferred, a "pull" operation can be utilized for system 100. In this form of operation, a data call, text message or the like can be placed periodically or on an as-desired basis from the communication servers 105-107 to a particular mobile device 102 to inquire (or "poll") regarding the position of the mobile device. This would then cause the device to analyze the satellite positioning signals, calculate its position, and then communicate its position (in like manner) back to the central position tracking network. If a data call is utilized in pull operation, it would of course be preferable if the mobile device calculates its position and transmits the position report message back to CPT network 101 before terminating the original poll call.

As depicted in FIG. 1, embodiments of the present invention optionally can utilize A-GPS technology (via A-GPS server 109 depicted) to assist in satellite positioning calculations. A-GPS technology is a known technology that conventionally uses an assistance server to cut down the time needed to determine a location using GPS. It is useful in urban areas, when the user is located in "urban canyons", under heavy tree cover, or even indoors where GPS signals from the satellites is of poor quality, thus making calculating a position difficult or even impossible. While standard GPS networks utilize only GPS satellites and GPS receivers, A-GPS networks allow the receiver to communicate with an assistance server that has high processing power and access to a reference network for obtaining additional satellite information.

A GPS receiver, such as GPS module 102a, must be able to acquire and measure the characteristics of an adequate number of satellite signals across a relatively broad and uniform expanse of the sky in order to support the calculation of a location of acceptable accuracy. When the propagation paths from the satellites to the receiver are occluded or significantly distorted (e.g., by multi-path propagation), a GPS-based solution is not available for the location determinations. Such signal problems occur, for example, when the GPS receiver is under foliage, behind terrain features, in the interiors of buildings, and/or at the base of downtown "urban canyons" with tall buildings obscuring the view of the sky. Ordinarily, a standard GPS device needs to have a clear line-of-sight to at least four GPS satellites before it can calculate its position. In addition, it needs enough processing power to transform the data streams from the satellites into a position. Using A-GPS, a local cell tower can receive the GPS signals from several GPS satellites simultaneously, and perform the position-determining calculations for the receiver. In such circumstances, all that is required is for the receiver to relay any GPS positioning signals it receives to the tower.

Thus, the optional embodiments of the invention including server 109 can allow the CPT network 101 to augment the GPS signal information received by the mobile devices and calculate device position on behalf of the devices if, for example, an adequate satellite fix cannot be obtained by a particular mobile device. This option can provide a function whereby the communication module 102c transmits, instead of calculated position data (e.g., latitude and longitude) in the position report message, the position report message instead contains details regarding the satellite signals and data that the particular mobile device was last able to obtain (optionally, along with a last know position). In such embodiments, the application server 108 is adapted to recognize such an incomplete position report and will utilize the A-GPS server 109 to calculate a position for that mobile device.

The A-GPS server, for example, can obtain satellite navigation data (e.g., orbit trajectory information, such as ephemeris) for the satellites know to be or though to be in view of the particular mobile device. This satellite navigation data may be collected by a "reference network" (note depicted) of tracking stations associated with the wireless communication network 103. The reference network may include several tracking stations that collect satellite navigation data from all the satellites in the constellation, or a few tracking stations, or a single tracking station that only collects satellite navigation data for a particular region of the world. The reference network may provide the collected satellite navigation data to the A-GPS server 109. The A-GPS 109 server typically will include suitable input/output interfaces configured to receive satellite navigation data from a reference network, to communicate with the tracking server, and to provide for communications over the Internet (e.g., T1/T3 connection, dial-up modem, DSL, and the like).

For example, satellite position fixing assistance data may be computed by the A-GPS server 109 using satellite trajectory data (e.g., ephemeris or other satellite trajectory model) and an approximate position of the mobile device 102. An approximate position of the mobile device 102 may be obtained using various position estimation techniques known in the art, including use of transitions between base stations of the wireless communication network 103, use of a last-known location of the particular mobile device 102, use of a location of a base station of the wireless communication network 103 in communication with the particular mobile device 102, use of a location of the wireless communication network 103 as identified by a network ID, or use of a location of a cell site of the wireless communication network 103 in which the mobile device 102 is operating as identified by a cell ID. Thus, in such optional embodiments of the invention, position information can be received for mobile devices even when GPS reception is poor.

Figure 2:
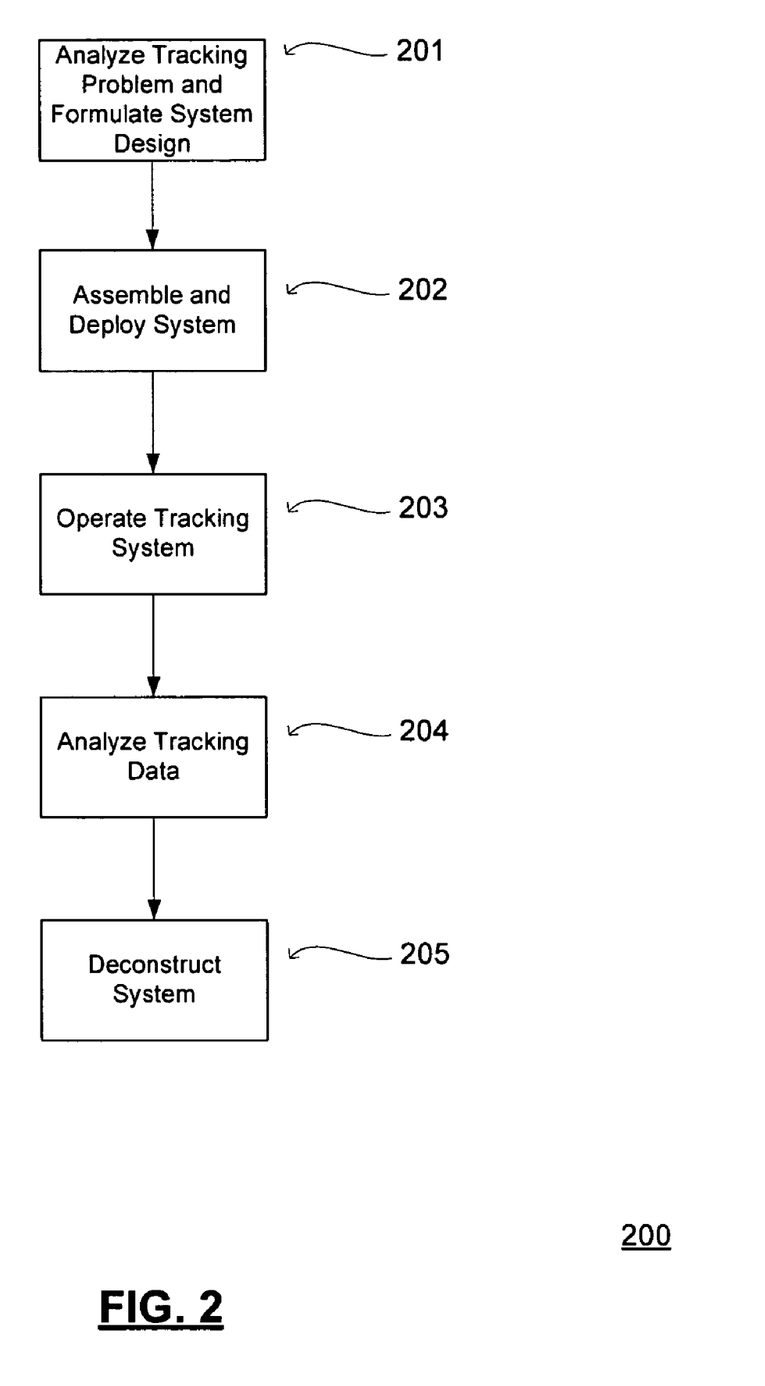
FIG. 2 is flow diagram showing a mobile object tracking process for utilizing a flexible location tracking system according to an embodiment of the present invention.

Referring now to FIG. 2, there is depicted the process flow for a flexible mobile object tracking process 200 suitable for utilizing a system according to the present invention during a short-term or fixed term project or event. In this embodiment of methods the invention, before deployment of the solution, it will of course be advisable for the users of the present invention to select mobile devices and wireless network service providers to meet the particular needs of the project. For example, if the study needed to cover a fairly large geographic area (such as the mid-Atlantic region of the United States), service coverage and service plans offered by various different wireless network providers would most likely be a primary factor. However, in situations where the ability to access the central position tracking network's data is needed at a variety of positions including at the mobile devices which are being tracked, it might be necessary to elect service providers, plans and devices such that suitable computing devices (e.g., PDAs and laptop computers) equipped with GPS and cellular broadband cards can be elected as one or more of the mobile devices. Finally, a particular situation may dictate rugged mobile devices with extensive battery power, thus necessarily limiting the options that realistically can be elected by the user for wireless network service providers, particular message communication mechanism employed (text message versus data call of IP message), and the like.

Thus, at step 201, process tracking process 200 begins with the analysis of tracking problem presented and the selection of appropriate equipment (mobile devices, tracking applications, etc.). The tracking solution is then deployed at step 202, with the assembly and/or configuration of the CPT network, the obtaining and configuration of mobile devices, and the negotiation and finalization of rights to use third party resources such as the wireless networks of cellular service providers (if necessary). The training of individuals using the system may also occur at step 202.

At step 203, once the system of the present invention is designed and assembled, use of the system occurs for position tracking. The use of the system is substantially as described above and below with respect to the schematic diagram of FIG. 1 and the flow diagram of FIG. 3. In any event, during step 203, the tracking database is populated with position data from various location report messages.

Step 204 includes the analysis of tracking data, which in some circumstances according to the present invention may occur only after all tracking information has been collected at step 203. Alternatively, of course, the analysis of the tracking data performed during step 204 can occur concurrently with the operation of the tracking system and the collection of position data (step 203). This analysis step can commence at any time after a sufficient amount of tracking data has been obtained from the operation of the deployed tracking system. As noted above, tracking information can be monitored (such as via a web browser interface) substantially in real-time as noted above if such would be helpful for the particular tracking problem presented.

Finally, tracking process 200 concludes following the end of the related project or event with step 205, wherein the break down of the tracking system occurs. This break down step includes the recovery of resources (mobile devices) and the closing out of service contracts.

Understandably, in the case of a consulting company, engineering firm or other professional services provider that offers object tracking services for hire utilizing process 200, it should be readily appreciated that the different mobile devices and CPT networks can be readily repositioned from one project/event to the next. In this regard, the flexible nature of the systems according to the present invention allows the professional services company to readily adapt and customize a particular implementation of the invention for a given purpose.

Figure 3:
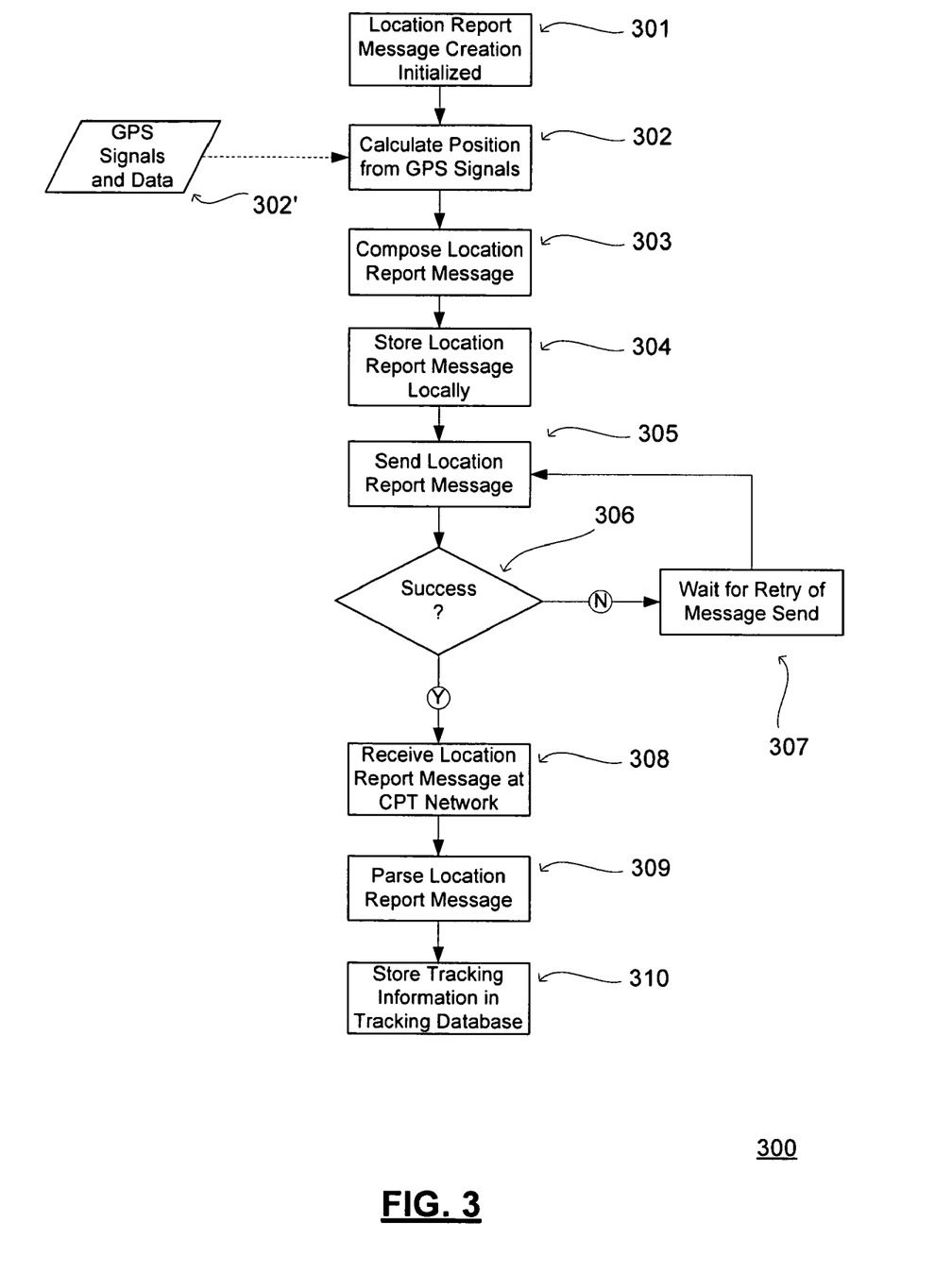
FIG. 3 is a flow diagram showing a location reporting process for use by mobile devices according to one embodiment of the present invention.

A location reporting process 300 for use by mobile devices to communicate with the CPT network according to one embodiment of the present invention is depicted in flow diagram format in FIG. 3. As shown in FIG. 3, locating reporting process 300 begins at step 301 with the initiating of a request for a location report message to be created and communicated to the CPT network. As noted above, this can be done either through a pull from the CPT network, or via a push (such as periodic task requested by the control applet running on each mobile device). This request causes the device to calculate its current position at step 302 from the currently received GPS signals and data 302'.

Once the current position is calculated (or determined to be unable to be calculated given current GPS signal strength), the applet uses the data from the GPS module of the mobile device to compose the location report message at step 303. As noted above, this message will include a variety of data, including, in preferred embodiments, at least position information, device ID information, and a time stamp. This composed location report message is then stored locally in the memory of the mobile device at step 304. This step serves as a backup in case message information is lost or corrupted in transit to the CPT network.

Next, process 300 sends the location report message over the wireless network to the CPT network using the selected communication protocol (text messaging, cellular data call, instant message, etc.). The device waits at step 306 to see if the message is successfully transmitted to the wireless network and/or CPT network. If the mobile device determines there was a communication failure (such as if the mobile device is outside of the range of its cellular network), it can wait at step 307 for a retry of the sending step, as depicted. In certain embodiments of the invention, this success determination and retry loop can be omitted to preserve, for example, battery and bandwidth resources.

Next, at step 308, the CPT network receives the location report message and the tracking application server parses the location report message at step 309. In situations where the message contains incomplete location data, for example, the tracking application server at this step can utilize the resources of the optional A-GPS server at this step. Similarly, if necessary, an XML extraction processing can take place in order to convert the contents of the received location report message into a format that is useable and recognizable by the various applications on the tracking application server. In embodiments of the invention where A-GPS techniques are used to supplement GPS signal information received by the mobile devices, the parsing step 309 can also include the tracking application server interfacing with an A-GPS server to create a complete locate report.

Finally, the tracking information contained in the received location report message is stored in the tracking database at step 310. At this time, the information will be accessible and reviewable by users for the various purposes as described above.

Various processes and methods described herein may be implemented using software stored in the memory for execution by suitable processors. Alternatively, the mobile devices and/or servers may implement such processes and methods in hardware or a combination of software and hardware, including any number of processors independently executing various programs and dedicated hardware, such as application specific integrated circuits (ASICs), field programmable gate arrays (FPGAs), and the like.

Further, in the above description of the preferred embodiments, the invention has been described many times with specific reference to application upon the Global Positioning System (GPS). It should be evident, however, that the methods and systems of the present invention are equally applicable to other satellite positioning systems. This includes, for example, the Russian GLONASS system, the European GALILEO system, combinations of these systems with one another, and combinations of these systems and other satellites providing similar signals, such as the wide area augmentation system (WAAS) and SBAS that provide GPS-like signals. The term "GPS" used herein includes such alternative satellite positioning systems, including the Russian GLONASS system, the European GALILEO system, the WAAS system, and the SBAS system, as well as combinations thereof.

Having described preferred embodiments of the invention, it will now become apparent to those of ordinary skill in the art that other embodiments incorporating these concepts may be used. Accordingly, it is submitted that that the invention should not be limited to the described embodiments but rather should be limited only by the spirit and scope of the appended claims.

Thus, although the invention has been described and illustrated with a certain degree of particularity, it is understood that the present disclosure has been made only by way of example, and that numerous changes in the combination and arrangement of steps or orientation of parts can be resorted to by those skilled in the art without departing from the spirit and scope of the invention, as will be claimed.

The invention claimed is:

1. A system for tracking the location of mobile entities using a constellation of satellites of a satellite positioning system, said tracking system comprising:
   a wireless communication network;
   one or more mobile devices, each said mobile device being associated with a particular mobile entity and comprising means for electronically communicating with said wireless communication network and means for receiving and interpreting positioning signals from one or more satellites to determine a then-current geographic position of that mobile device; and
   a central position tracking platform, said central position tracking platform being in electronic communication with said wireless communication network and including a server running a position tracking application and a database for storing position tracking information regarding said mobile entities, and said central position tracking platform having a front end interface for enabling a user to review said position tracking information in real time,
   wherein each said mobile device is configured to transmit a location report message upon a position request, said location report message containing position information of the mobile device originating the message and being transmitted via said wireless communication network to said central position tracking platform where said position information is stored in said database, and wherein if a mobile device cannot determine said then-current position, then said location report message from said mobile device contains information selected from a group consisting of: a last-known position, a set of satellite positioning signal data, and an identification of why said mobile device could not determine said then-current position.

2. The tracking system according to claim 1, wherein a first one of said mobile devices is configured to communicate via a first communication protocol with said wireless communication network and a second one of said mobile devices is configured to communicate via a second communication protocol with said wireless communication network.

3. The tracking system according to claim 1, wherein said central position tracking platform includes a plurality of communication servers in communication with said wireless communication network, said communication servers including a data call communication server for receiving telephone calls from said mobile devices, a text messaging server for receiving text messages from said mobile devices, and an IP communications server for receiving TCP/IP based communications from said mobile devices.

4. The tracking system according to claim 1, wherein said front end interface is accessed by a user with an Internet browser through a secure networking application.

5. The tracking system according to claim 1, wherein a plurality of said mobile devices comprise GPS-enabled cellular telephones and location messages are encoded in text messages and sent by said telephones according to a text messaging protocol supported by the wireless communication network.

6. The tracking system according to claim 5, wherein said telephones are adapted to continuously retry sending of a given text message until it is successfully transmitted to said wireless communication network.

7. The tracking system according to claim 5, wherein said telephones are running an applet that causes said telephones to send a text message at preset intervals, each said text message indicating the then-current position of said telephone.

8. The tracking system according to claim 1, wherein said mobile devices comprise a variety of types and communicate via said wireless communication network via a variety of mechanisms.

9. The tracking system according to claim 1, wherein said mobile device comprises a GPS-enabled cellular telephone and said wireless communication network is a cellular communication network.

10. The tracking system according to claim 1, wherein said satellite positioning system is the global positioning system.

11. The tracking system according to claim 1, wherein users can interact with said central position tracking platform remotely over a distributed computer network.

12. The tracking system according to claim 1, wherein said central position tracking platform comprises a computer network of associated computing devices, storage devices, and computing applications.

13. The tracking system according to claim 1, wherein said position request comprises a communication sent by said central position tracking platform to target mobile devices.

14. The tracking system according to claim 1, wherein a plurality of said mobile devices comprise computing devices equipped with satellite positioning receivers, satellite positioning applications, and with wireless broadband communication means such that mobile entities associated with said mobile devices that are said computing devices may access position information stored in said database of said central position tracking platform via said front end interface.

15. The tracking system according to claim 1, wherein said central position tracking platform comprises an assisted GPS server adapted to perform satellite positioning calculations when location report messages contain incomplete position information.

16. A method for flexibly tracking the position of one or more mobile entities using a constellation of satellites of a satellite positioning system, said method comprising:

analyzing a tracking problem to formulate a design of a location tracking system, said design including a selection of a wireless communication network, and a configuration of a central position tracking platform to be in electronic communication with said wireless communication network, said central position tracking platform including a server running a position tracking application and a database for storing position tracking information regarding said mobile entities, said location tracking system design further including an assignment of particular mobile device types to particular mobile entities where said assigned mobile device types are compatible with said wireless communication network and said central position tracking platform and suitable for said tracking problem;

assembling and deploying the location tracking system, said assembling and deploying including distributing mobile devices of said assigned mobile device types to said mobile entities;

operating the location tracking system, said operating including having each said mobile device transmit a location report message upon a position request, said location report message containing position information of the mobile device originating the message and being transmitted via said wireless communication network to said central position tracking platform where said position information is stored in said databases, wherein a mobile device of said distributed mobile devices comprises means for electronically communicating with said wireless communication network and means for receiving and interpreting a positioning signal from a satellite to determine a then-current geographic position of said mobile device, and wherein if said mobile device cannot determine said then-current position upon said position request, said location report message transmitted by said mobile device contains information selected from a group consisting of: a last-known position, a set of satellite positioning signal data, and an identification of why said mobile device could not determine said then-current position;

analyzing the tracking data stored in said database.

17. The method according to claim 16, wherein a first one of said mobile devices is configured to communicate via a first communication protocol with said wireless communication network and a second one of said mobile devices is configured to communicate via a second communication protocol with said wireless communication network.

18. The method according to claim 16, wherein said central position tracking platform includes a plurality of communication servers in communication with said wireless communication network, said communication servers including a data call communication server for receiving telephone calls from said mobile devices, a text messaging server for receiving text messages from said mobile devices, and an IP communications server for receiving TCP/IP based communications from said mobile devices.

19. The method according to claim 16, wherein said analyzing said tracking data stored in said database is performed by a user accessing a front end interface of said central position tracking platform via an Internet browser through a secure networking application.

20. The method according to claim 16, wherein a plurality of said mobile entities are assigned GPS-enabled cellular telephones as said mobile devices, and wherein said location report messages transmitted during said operating of the location tracking system are encoded in text messages and sent by said telephones according to a text messaging protocol supported by the wireless communication network.

21. The method according to claim 20, wherein said telephones run an applet that causes said telephones to send text messages at preset intervals, each said text messages indicating the then-current position of a sending telephone.

22. The method according to claim 16, wherein said mobile devices are of a variety of types and communicate via said wireless communication network via a variety of mechanisms.

23. The method according to claim 16, wherein said mobile devices comprise a GPS-enabled cellular telephone and said wireless communication network is a cellular communication network.

24. The method according to claim 16, wherein said position request comprises a communication sent by said central position tracking platform to target mobile devices.

25. The method according to claim 16, wherein a plurality of said mobile devices comprises computing devices equipped with satellite positioning receivers, satellite positioning applications, and with wireless broadband communication means such that mobile entities associated with said plurality of mobile devices that are said computing devices may access position information stored in said database of said central position tracking platform via a front end interface.

26. A system for tracking the location of mobile entities using a constellation of satellites of a satellite positioning system, said tracking system comprising:
  a wireless communication network;
  a mobile device associated with a particular mobile entity and comprising means for electronically communicating with said wireless communication network and means for receiving and interpreting a positioning signal from a satellite in the constellation to determine a current geographic position of the mobile device; and
  a central position tracking platform, said central position tracking platform being in electronic communication with said wireless communication network and including a server running a position tracking application and a database for storing position tracking information regarding said mobile entity, and said central position tracking platform having a front end interface for enabling a user to review said position tracking information in real time;
  wherein said mobile device contains an applet configured to transmit a location report message at regular intervals, said location report message containing position tracking information reflecting said current geographic position obtained from said receiving and interpreting means and being transmitted by said communicating means of said mobile device via said wireless communication network to said central position tracking platform where said position tracking information is stored in said database, and
  wherein if said mobile device cannot determine said current geographic position, said location report message contains information selected from a group consisting of: a last-known position, a set of satellite positioning signal data, and an identification of why said mobile device could not determine said current position.

27. A system for tracking the location of a mobile device, comprising:
  a wireless communication network configured to communicate with the mobile device;
  a database in electronic communication with the wireless communication network for storing positioning information received by the wireless communication; and
  a position tracking platform in electronic communication with the wireless communication network and the database, the position tracking platform configured to transmit a position request to the mobile device and to determine an approximate position of the mobile device based on the position information stored in the database;
  wherein the mobile device is configured to receive positioning signals from a satellite and to transmit a location report message to the wireless communication network in response to the position request, the location report message containing position information of the mobile device, including a current geographic position of the mobile device if the mobile device can determine the current geographic position based on the positioning signals, and
  wherein if the mobile device cannot determine the current geographic position, the location report message transmitted by the mobile device contains positioning information, including information that aids in determining the approximate position of the mobile device.

* * * * *

UNITED STATES PATENT AND TRADEMARK OFFICE
CERTIFICATE OF CORRECTION

| | | |
|---|---|---|
| PATENT NO. | : 7,528,714 B2 | Page 1 of 1 |
| APPLICATION NO. | : 11/509694 | |
| DATED | : May 5, 2009 | |
| INVENTOR(S) | : Joseph R. Schlesier et al. | |

It is certified that error appears in the above-identified patent and that said Letters Patent is hereby corrected as shown below:

In Claim 16, column 16, line 40, "databases," should read --database,--.

Signed and Sealed this

Thirtieth Day of June, 2009

JOHN DOLL
*Acting Director of the United States Patent and Trademark Office*